United States Patent
Fukaura et al.

(10) Patent No.: US 11,060,839 B2
(45) Date of Patent: Jul. 13, 2021

(54) MEASURING JIG

(71) Applicant: HONDA MOTOR CO., LTD., Tokyo (JP)

(72) Inventors: Shigeru Fukaura, Tokyo (JP); Nadao Matsuyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 217 days.

(21) Appl. No.: 16/508,863

(22) Filed: Jul. 11, 2019

(65) Prior Publication Data
US 2020/0049478 A1 Feb. 13, 2020

(30) Foreign Application Priority Data

Aug. 10, 2018 (JP) .............................. JP2018-151995

(51) Int. Cl.
*G01B 5/12* (2006.01)
*G01B 5/00* (2006.01)

(52) U.S. Cl.
CPC .............. *G01B 5/12* (2013.01); *G01B 5/0002* (2013.01)

(58) Field of Classification Search
CPC ................................ G01B 5/12; G01B 5/0002
USPC ..................................................... 33/542, 543
See application file for complete search history.

(56) References Cited

U.S. PATENT DOCUMENTS

| | | | | | |
|---|---|---|---|---|---|
| 4,574,487 | A | * | 3/1986 | Meyer, Jr. ................ | G01B 3/26 33/501.3 |
| 5,424,639 | A | * | 6/1995 | Meiffren ................ | G01D 11/30 324/219 |
| 2009/0144999 | A1 | * | 6/2009 | Lau ........................ | G01B 5/12 33/544.1 |
| 2014/0215841 | A1 | * | 8/2014 | Danbury ................ | G01B 5/008 33/503 |
| 2014/0360034 | A1 | * | 12/2014 | Shemeta ................ | G01B 5/245 33/534 |
| 2015/0159987 | A1 | * | 6/2015 | Abe ........................ | G01B 5/008 33/503 |
| 2019/0358762 | A1 | * | 11/2019 | Lause .................. | B23Q 17/225 |

FOREIGN PATENT DOCUMENTS

| | | |
|---|---|---|
| JP | H09-210605 A | 8/1997 |
| JP | 2004-257750 A | 9/2004 |
| JP | 2014-055888 | 3/2014 |

OTHER PUBLICATIONS

Japanese Office Action dated Dec. 17, 2019, Application No. 2018151995; English machine translation included, 5 pages.
Indian Office Action dated Feb. 26, 2021, includes English Text, 5 pages.
Chinese Office Action dated Nov. 24, 2020, 6 pages.

* cited by examiner

*Primary Examiner* — George B Bennett
(74) *Attorney, Agent, or Firm* — Rankin, Hill & Clark LLP

(57) ABSTRACT

In a measuring jig for measuring an inner diameter of a valve hole portion formed coaxially with a guide hole, the measuring jig includes: an insertion shaft inserted into the guide hole; and a measuring instrument having a probe that is disposed around an axis of the insertion shaft and that is brought into contact with an inner wall of the valve hole portion. The inner diameter of the valve hole portion is measured by way of the probe by turning the measuring instrument about the axis, and the measuring instrument is disposed on the axis.

14 Claims, 7 Drawing Sheets

MEASURING JIG

INCORPORATION BY REFERENCE

The present application claims priority under 35 U.S.C. § 119 to Japanese Patent Application No. 2018-151995 filed on Aug. 10, 2018. The content of the application is incorporated herein by reference in its entirety.

TECHNICAL FIELD

The present invention relates to a measuring jig.

BACKGROUND ART

Conventionally, there has been known a measuring jig which measures an inner diameter of a hole portion formed coaxially with a reference hole. The measuring jig includes: an insertion shaft inserted into the reference hole; and a measuring instrument that has a probe disposed around an axis of the insertion shaft and that is brought into contact with an inner wall of the hole portion. An inner diameter of the hole portion is measured by way of the probe by turning the measuring instrument about the axis (see Patent Literature 1, for example). In the measuring jig of Patent Literature 1, the measuring instrument is disposed around an axis of the insertion shaft.

CITATION LIST

Patent Literature

[Patent Literature 1] JP-A No. 2014-55888

SUMMARY OF INVENTION

Technical Problem

However, in the above-mentioned conventional measuring jig, the measuring instrument turns at a position away from the axis of the insertion shaft and hence, a turning radius of the measuring instrument becomes large, and thus it is necessary to ensure a large space around the measuring jig at the time of performing the measurement. Accordingly, when a sufficient space cannot be ensured around the measuring jig, it is difficult to perform the measurement.

The present invention has been made in view of such circumstances, and it is an object of the present invention to provide a measuring jig that can measure an inner diameter of a hole portion even when a space around a measuring jig is limited.

Solution to Problem

The measuring jig is a measuring jig for measuring an inner diameter (D2) of a hole portion (20) formed coaxially with a reference hole (23), the measuring jig including: an insertion shaft (32) inserted into the reference hole (23); and a measuring instrument (31) having a probe (41) that is disposed around an axis (32d) of the insertion shaft (32) and that is brought into contact with an inner wall of the hole portion (20), wherein the inner diameter (D2) of the hole portion (20) is measured by way of the probe (41) by turning the measuring instrument (31) about the axis (32d), and the measuring instrument (31) is disposed on the axis (32d).

In the above-mentioned configuration, the measuring jig may also include an operation shaft (34b, 234b) for turning the measuring instrument (31), and the measuring instrument (31) may be positioned on an operation axis (34e, 234e) that is an axis of the operation shaft (34b, 234b).

In the above-mentioned configuration, the axis (32d) of the insertion shaft (32) and the operation axis (34e, 234e) may be disposed coaxially with each other.

In the above-mentioned configuration, a master gauge (50) has: a positioning hole (51) formed for positioning the insertion shaft (32); and an inner diameter reference hole (52) provided coaxially with the positioning hole (51), an inner diameter of the inner diameter reference hole (52) being preliminarily set to a reference value (D1) may be provided. The reference value (D1) that is an inner diameter of the inner diameter reference hole (52) may be measured by way of the probe (41) by turning the measuring instrument (31) about the axis (32d) of the insertion shaft (32) in a state where the insertion shaft (32) is positioned by the positioning hole (51) with respect to the master gauge (50), and a difference between the reference value (D1) and the inner diameter (D2) of the hole portion (20) may be measured.

In the above-mentioned configuration, the hole portion (20) may be a valve hole portion (20) of an engine including a cylinder head (16) and a cylinder (13), the cylinder head (16) and the cylinder (13) may be integrally formed with each other, and the measuring instrument (31) may be configured to turn in the cylinder (13).

In the above-mentioned configuration, the valve hole portion (20) may include a valve contact surface (25a) with which a valve face of a valve (14) of the engine is brought into contact, and the probe (41) may be configured to measure an inner diameter of the valve contact surface (25a).

Further, in the above-mentioned configuration, the measuring instrument (31) may include the probe (41) and a case (40) that supports the probe (41) in a swingable manner, and the case (40) may be disposed on the axis (32d).

In the above-mentioned configuration, the case (40) may be formed into a box shape and the probe (41) may be supported on one end portion of the case (40) in a longitudinal direction of the case (40), the insertion shaft (32) may be mounted on the case (40), and the axis (32d) of the insertion shaft (32) may be inclined with respect to a case axis (40b) that is an axis of the case (40) in the longitudinal direction.

In the above-mentioned configuration, the case (40) may include an insertion shaft mounting surface (40c) on which the insertion shaft (32) is mounted and an operation shaft mounting surface (40d) positioned on a side opposite to the insertion shaft mounting surface (40c), and the operation shaft (34b) for turning the measuring instrument (31) may be mounted on the operation shaft mounting surface (40d).

In the above-mentioned configuration, the insertion shaft (32) may include a stepped portion (32c) that is brought into contact with a bottom portion (20a) of the hole portion (20).

In the above-mentioned configuration, the insertion shaft (32) may be supported in a state where a length of the insertion shaft (32) in an axial direction is adjustable with respect to the measuring instrument (31).

In the above-mentioned configuration, the insertion shaft (32) may include the stepped portion (32c) that is brought into contact with a bottom portion (20a) of the hole portion (20), and the master gauge (50) may include a spacer (53) that is interposed between the stepped portion (32c) of the insertion shaft (32) and the master gauge (50).

In the above-mentioned configuration, the insertion shaft (32) may be supported in a state where a length of the insertion shaft (32) in the axial direction is adjustable with respect to the measuring instrument (31).

Further, in the above-mentioned configuration, the measuring jig may include an operation shaft (234b) for turning the measuring instrument (31), and the operation shaft (234b) may pass through the reference hole (23) and extend to the outside of the cylinder head (16).

Advantageous Effects of Invention

The measuring jig according to the present invention is the measuring jig for measuring an inner diameter of a hole portion formed coaxially with a reference hole. The measuring jig includes: the insertion shaft inserted into the reference hole; and the measuring instrument having the probe that is disposed around an axis of the insertion shaft and that is brought into contact with the inner wall of the hole portion. The inner diameter of the hole portion is measured by turning the measuring instrument about the axis by way of the probe. The measuring instrument is disposed on the axis.

With such a configuration, the measuring instrument is disposed on the axis of the insertion shaft and hence, a turning radius of the measuring instrument about the axis becomes small. Accordingly, even when the space around the measuring jig is limited, an inner diameter of the hole portion can be measured.

In the above-mentioned configuration, the measuring jig may include the operation shaft for turning the measuring instrument, and the measuring instrument may be positioned on the operation axis that is the axis of the operation shaft. With such a configuration, the run-out of the operation shaft at the time of turning the measuring instrument about the axis of the insertion shaft can be made small and hence, even when the space around the measuring jig is limited, the inner diameter of the hole portion can be measured.

In the above-mentioned configuration, the axis of the insertion shaft and the operation axis are disposed coaxially with each other. With such a configuration, the run-out of the operation shaft at the time of turning the measuring instrument about the axis of the insertion shaft can be made small and hence, even when the space around the measuring jig is limited, the inner diameter of the hole portion can be measured.

In the above-mentioned configuration, the master gauge has: the positioning hole formed for positioning the insertion shaft; and the inner diameter reference hole formed coaxially with the positioning hole, an inner diameter of the inner diameter reference hole being preliminarily set to a reference value may be provided. The reference value that is the inner diameter of the inner diameter reference hole may be measured by way of the probe by turning the measuring instrument about the axis of the insertion shaft in a state where the insertion shaft is positioned by the positioning hole with respect to the master gauge. The difference between the reference value and the inner diameter of the hole portion may be measured. With such a configuration, the inner diameter of the hole portion can be easily measured based on the reference value of the master gauge with high accuracy.

In the above-mentioned configuration, the hole portion may be the valve hole portion of the engine including the cylinder head and the cylinder, the cylinder head and the cylinder may be integrally formed with each other, and the measuring instrument may be configured to turn in the cylinder. With such a configuration, even in the structure where the cylinder head and the cylinder are not easily separated from each other, the inner diameter of the valve hole portion of the engine can be measured by turning the measuring instrument in the cylinder.

In the above-mentioned configuration, the valve hole portion may include the valve contact surface with which the valve face of the valve of the engine is brought into contact, and the probe may measure the inner diameter of the valve contact surface. With such a configuration, even when the space around the measuring jig is limited, the inner diameter of the valve contact surface of the valve hole portion can be measured.

In the above-mentioned configuration, the measuring instrument may include the probe and the case that supports the probe in a swingable manner, and the case may be disposed on the axis. With such a configuration, a turning radius of the case about the axis of the insertion shaft becomes small. Accordingly, even when the space around the measuring jig is limited, the inner diameter of the hole portion can be measured.

In the above-mentioned configuration, the case may be formed into a box shape and the probe may be supported on one end portion of the case in a longitudinal direction of the case, the insertion shaft may be mounted on the case, and the axis of the insertion shaft may be inclined with respect to the case axis that is the axis of the case in the longitudinal direction. With such a configuration, the axis of the insertion shaft is inclined with respect to the case axis of the measuring instrument and hence, the measuring instrument can be easily disposed on the axis of the insertion shaft. Further, an area of a portion of the case for mounting the insertion shaft can be increased and hence, the insertion shaft can be effectively fixed.

In the above-mentioned configuration, the case may include the insertion shaft mounting surface on which the insertion shaft is mounted and the operation shaft mounting surface positioned on a side opposite to the insertion shaft mounting surface. The operation shaft for turning the measuring instrument may be mounted on the operation shaft mounting surface. With such a configuration, the operation shaft is mounted on the operation shaft mounting surface positioned on a side opposite to the insertion shaft mounting surface and hence, the operation shaft can be disposed in a compact manner.

In the above-mentioned configuration, the insertion shaft may include the stepped portion that is brought into contact with the bottom portion of the hole portion. With such a configuration, by bringing the stepped portion of the insertion shaft into contact with the bottom portion of the hole portion, the measuring instrument can be positioned in the axial direction of the insertion shaft, and the inner diameter of the hole portion can be measured accurately.

In the above-mentioned configuration, the insertion shaft may be supported in a state where a length of the insertion shaft in an axial direction is adjustable with respect to the measuring instrument. With such a configuration, the length of the insertion shaft can be adjusted corresponding to a shape of the reference hole and a shape of the hole portion and hence, it is possible to acquire the measuring jig having high versatility.

In the above-mentioned configuration, the insertion shaft may include the stepped portion that is brought into contact with the bottom portion of the hole portion, and the master gauge may include the spacer that is interposed between the stepped portion of the insertion shaft and the master gauge. With such a configuration, due to the spacer interposed between the stepped portion of the insertion shaft and the master gauge, the measuring instrument can be positioned at the proper position in the axial direction with respect to the master gauge, thus properly setting the reference value in the measuring instrument.

In the above-mentioned configuration, the insertion shaft may be supported in a state where a length of the insertion shaft in the axial direction is adjustable with respect to the measuring instrument. With such a configuration, it is possible to acquire the measuring jig having high versatility. Further, by adjusting the position of the insertion shaft, the measuring instrument can be positioned at the proper position in the axial direction with respect to the master gauge, thus properly setting the reference value in the measuring instrument.

Further, in the above-mentioned invention, the measuring jig may include the operation shaft for turning the measuring instrument, and the operation shaft may pass through the reference hole and extend to the outside of the cylinder head. With such a configuration, handling of the operation shaft can be facilitated.

DESCRIPTION OF EMBODIMENTS

Hereinafter, an embodiment of the present invention is described with reference to drawings.

First Embodiment

Figure 1:
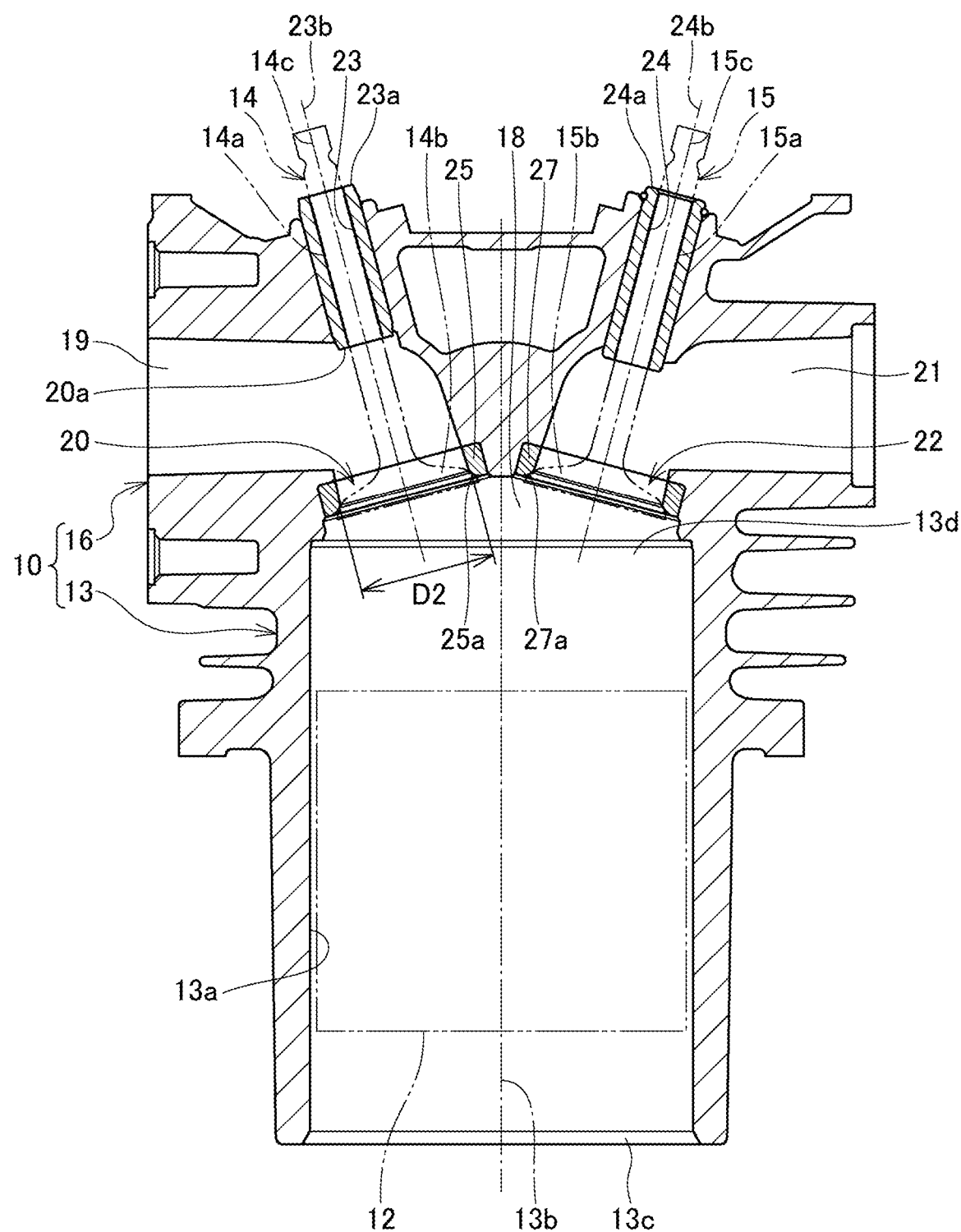
FIG. 1 is a cross-sectional view of a cylinder body which is an object to be measured.
Figure 2:
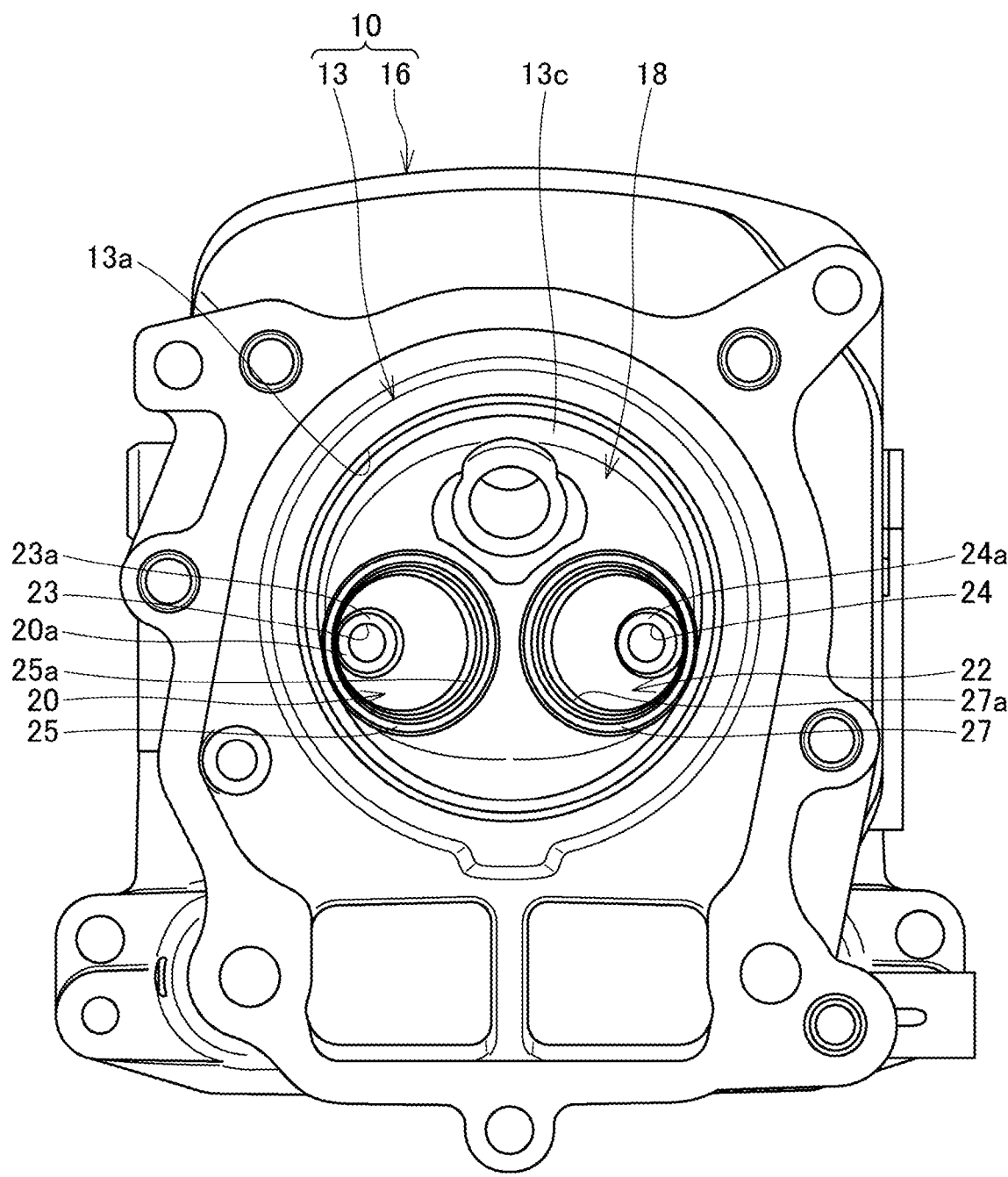
FIG. 2 is a view of the cylinder body as viewed in an axial direction.
Figure 3:
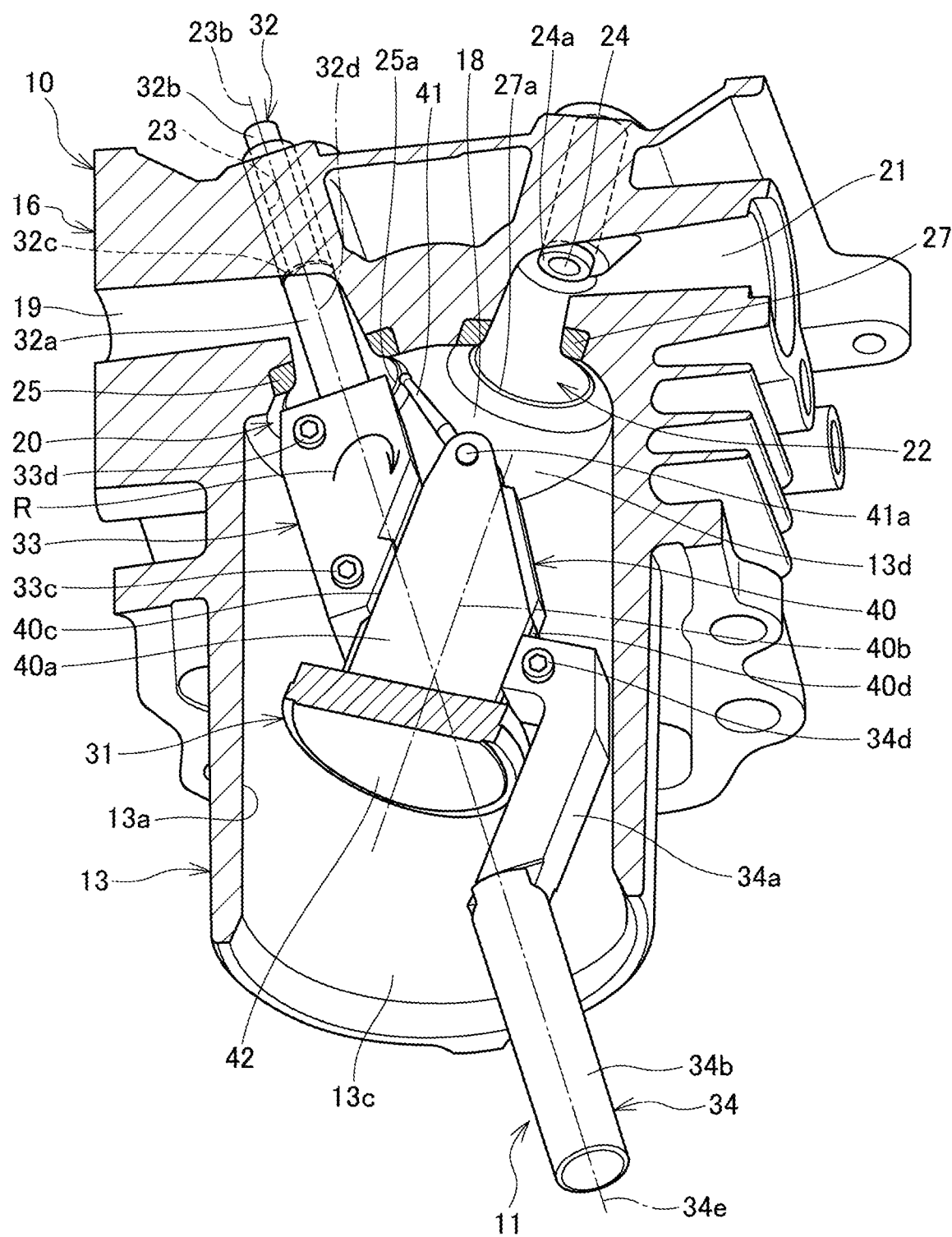
FIG. 3 is a cross-sectional view showing a state where a shape of the cylinder body is measured by a measuring jig.

FIG. 1 is a cross-sectional view of a cylinder body 10 which is an object to be measured. FIG. 2 is a view of the cylinder body 10 as viewed in an axial direction. FIG. 3 is a cross-sectional view showing a state where a shape of the cylinder body 10 is measured by a measuring jig 11.

The cylinder body 10 is joined to a crankcase (not shown in the drawing) of an engine, and forms a part of the engine.

The cylinder body 10 includes: a cylinder 13 in which a piston 12 is housed; and a cylinder head 16 provided with an intake valve 14 and an exhaust valve 15.

The cylinder 13 has a circular cylindrical shape, and the piston 12 reciprocates in an inner peripheral portion 13a of the cylinder 13 along a cylinder axis 13b of the cylinder 13. The piston 12 is connected to a crankshaft (not shown in the drawing) supported by the above-mentioned crankcase by way of a connecting rod (not shown in the drawing) which passes through an opening 13c formed on one end of the cylinder 13.

The cylinder head 16 includes: a combustion chamber 18 which communicates with an opening 13d formed on the other end of the cylinder 13; an intake passage 19 through which intake air passes; an intake-side valve hole portion 20 (hole portion) which makes the intake passage 19 communicate with the combustion chamber 18; an exhaust passage 21 through which exhaust air passes; and an exhaust-side valve hole portion 22 (hole portion) which makes the exhaust passage 21 communicate with the combustion chamber 18.

The intake valve 14 has a shaft-like valve stem 14a, and an umbrella portion 14b which is mounted on a distal end of the valve stem 14a.

The exhaust valve 15 has a shaft-like valve stem 15a, and an umbrella portion 15b which is mounted on a distal end of the valve stem 15a.

The intake valve 14 is disposed on a side opposite to the exhaust valve 15 with the cylinder axis 13b sandwiched therebetween.

The intake valve 14 and the exhaust valve 15 are respectively disposed obliquely with respect to the cylinder axis 13b. A valve axes forming angle formed by a valve axis 14c of the intake valve 14 and a valve axis 15c of the exhaust valve 15 is an acute angle.

The cylinder head 16 has a guide hole 23 (reference hole) which supports the valve stem 14a of the intake valve 14, and a guide hole 24 (reference hole) which supports the valve stem 15a of the exhaust valve 15.

The intake-side guide hole 23 is formed by an inner peripheral portion of a circular-cylindrical valve stem holder 23a embedded in the cylinder head 16.

The exhaust-side guide hole 24 is formed by an inner peripheral portion of a circular-cylindrical valve stem holder 24a embedded in the cylinder head 16.

The intake-side valve hole portion 20 is a hole coaxially formed with the guide hole 23, and an axis of the valve hole portion 20 agrees with an axis 23b of the guide hole 23. The valve hole portion 20 is positioned between the guide hole 23 and the combustion chamber 18.

A valve seat 25 which receives the umbrella portion 14b is formed on an opening end of the valve hole portion 20. The valve seat 25 has a circular ring shape, and a valve contact surface 25a which is brought into contact with the umbrella portion 14b is formed on an inner peripheral surface of the valve seat 25. The valve contact surface 25a is an inclined surface having a tapered shape which conforms with a shape of a valve face of the umbrella portion 14b.

The intake valve 14 moves in an axial direction while being guided by the guide hole 23, thus opening or closing the valve hole portion 20 by the umbrella portion 14b.

The exhaust-side valve hole portion 22 is a hole coaxially formed with the guide hole 24, and an axis of the valve hole portion 22 agrees with an axis 24b of the guide hole 24. The valve hole portion 22 is positioned between the guide hole 24 and the combustion chamber 18.

A valve seat 27 which receives the umbrella portion 15b is formed on an opening end of the valve hole portion 22. The valve seat 27 has a circular ring shape, and a valve contact surface 27a which is brought into contact with the umbrella portion 15b is formed on an inner peripheral surface of the valve seat 27. The valve contact surface 27a is an inclined surface having a tapered shape which conforms with a shape of a valve face of the umbrella portion 15b.

The exhaust valve 15 moves in an axial direction while being guided by the guide hole 24, thus opening or closing the valve hole portion 22 by the umbrella portion 15b.

The cylinder body 10 is an integral body formed of the cylinder 13 and the cylinder head 16. The cylinder body 10 is formed in such a manner that the cylinder 13 and the cylinder head 16 are formed as an integral body by casting, for example, finish working such as formation of holes is applied to the integral body by machining or the like and, then, the valve stem holders 23a, 24a and the valve seats 25, 27 are mounted on the cylinder body 10.

Figure 4:
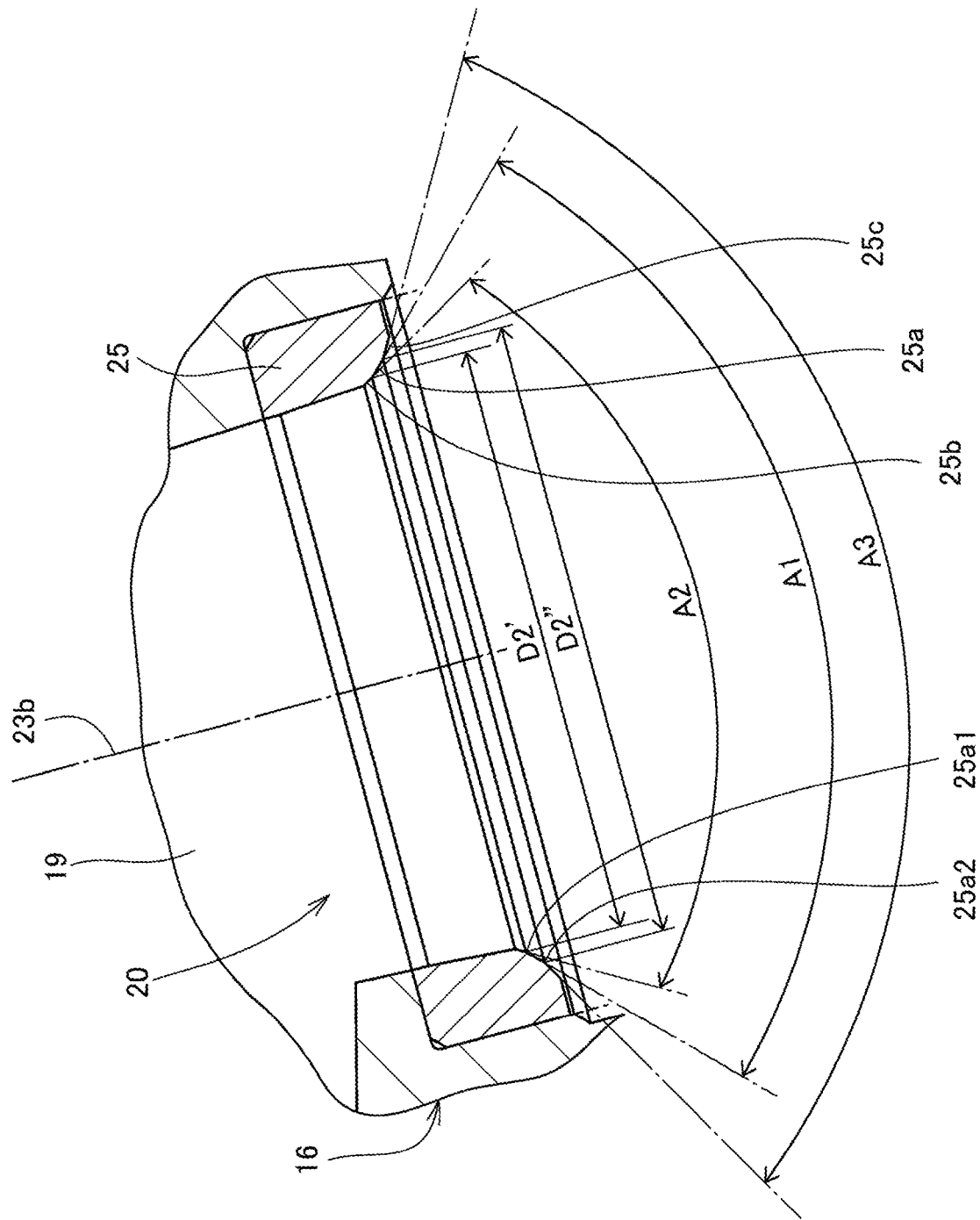
FIG. 4 is an enlarged cross-sectional view of a valve hole portion.

FIG. 4 is an enlarged cross-sectional view of the valve hole portion 20.

As shown in FIG. 4, on an opening end of the valve hole portion 20, the valve contact surface 25a, and a first inclined surface portion 25b and a second inclined surface portion 25c which are respectively continuously formed with the valve contact surface 25a are formed.

The valve contact surface 25a has a small diameter end 25a1 and a large diameter end 25a2 which has a larger diameter than the small diameter end 25a1. The valve contact surface 25a is a tapered hole whose diameter is continuously increased from the small diameter end 25a1 to the large diameter end 25a2 positioned on a combustion chamber 18 side.

That is, an inner diameter D2 of the valve contact surface 25a (see FIG. 1) falls within a range from an inner diameter D2' at the small diameter end 25a1 to an inner diameter D2" at the large diameter end 25a2.

The first inclined surface portion 25b is an inner peripheral portion which extends from the small diameter end 25a1 toward an intake passage 19 side.

The second inclined surface portion 25c is an inner peripheral portion extending from the large diameter end 25a2 toward the combustion chamber 18 side.

The first inclined surface portion 25b and the second inclined surface portion 25c are formed into a tapered shape so as to be continuously formed with the valve contact surface 27a respectively.

To be more specific, an angle A1 of the taper of the valve contact surface 27a is 90° as one example. When the angle A1 of the taper is 90°, in FIG. 4, a gradient angle on one side of the taper of the valve contact surface 27a is 45° which is half of 90°.

An angle A2 of the taper of the first inclined surface portion 25b is smaller than the angle A1 of the taper of the valve contact surface 27a, that is, is smaller than 90°.

An angle A3 of the taper of the second inclined surface portion 25c is larger than the angle A1 of the taper of the valve contact surface 27a, that is, is larger than 90°.

Figure 5:
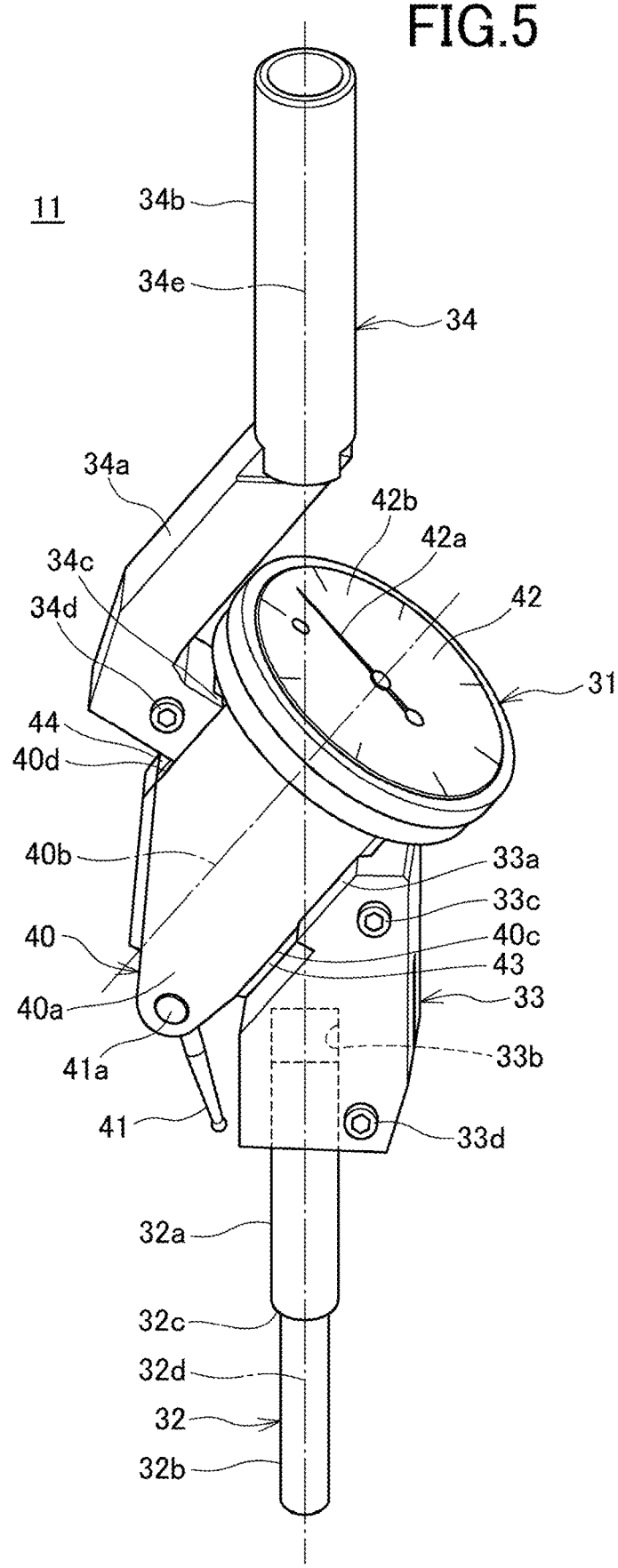
FIG. 5 is a perspective view of the measuring jig.

FIG. 5 is a perspective view of the measuring jig 11.

With reference to FIG. 3 and FIG. 5, the measuring jig 11 is a measuring instrument for measuring a circular run-out of an inner diameter of the valve hole portion 20, and for measuring a circular run-out of an inner diameter of the valve hole portion 22. In this embodiment, the description is made by taking the measurement of the intake-side valve hole portion 20 as an example.

The measuring jig 11 includes, a measuring instrument 31, an insertion shaft 32 which is inserted into the guide hole 23, a shaft support member 33 which fixes the insertion shaft 32 to the measuring instrument 31, and an operation member 34 which a measurer grips.

The measuring instrument 31 is a lever-type dial gauge. The measuring instrument 31 includes: a box-shaped case 40; a probe 41 which is supported on the case 40 in a swingable manner and protrudes outward from the case 40; and a display part 42 which displays a measured value.

The measuring instrument 31 includes a magnification changing mechanism (not shown in the drawing) which changes a magnification of a swing amount of the probe 41 by making use of the principle of lever, and transmits a magnified swing amount to the display part 42. The magnification changing mechanism is housed in the case 40. The magnification changing mechanism includes: an arm which is connected to the probe 41; and a plurality of gears which are driven by the arm.

The display part 42 includes: a pointer 42a which is rotated interlockingly with the swing of the probe 41; and a disc-like scale plate 42b which displays a rotation amount of the pointer 42a. The display part 42 is of an analog type, but may be of a digital type.

The case 40 has an approximately rectangular box shape, and the probe 41 is mounted on one end portion of the case 40 in a longitudinal direction of the case 40. The probe 41 has a rod shape. A proximal end portion of the probe 41 is supported on the case 40 by way of a rod support shaft 41a which extends in a plate thickness direction of the case 40. The probe 41 is swingable about the rod support shaft 41a. The rod support shaft 41a is orthogonal to a side surface 40a of the case 40 in the plate thickness direction of the case 40.

The display part 42 is mounted on the other end of the case 40 in the longitudinal direction of the case 40. The display part 42 is disposed in a state where a case axis 40b which is an axis of the case 40 in the longitudinal direction of the case 40 is directed in a direction approximately orthogonal to the scale plate 42b which forms a display surface.

One side surface of the case 40 in a width direction of the case 40 forms an insertion shaft mounting surface 40c on which the insertion shaft 32 is mounted.

The other side surface of the case 40 in the width direction of the case 40 forms an operation shaft mounting surface 40d on which the operation member 34 is mounted.

The insertion shaft mounting surface 40c and the operation shaft mounting surface 40d are substantially parallel to the case axis 40b. The case axis 40b is positioned at an intermediate portion between the insertion shaft mounting surface 40c and the operation shaft mounting surface 40d.

A rail portion 43 extending along the case axis 40b is formed on the insertion shaft mounting surface 40c.

A rail portion 44 extending along the case axis 40b is formed on the operation shaft mounting surface 40d.

The rod-like probe 41 is not disposed parallel to the case axis 40b, and falls toward an insertion shaft mounting surface 40c side as viewed in an axial direction of the rod support shaft 41a.

The shaft support member 33 has a block shape, and is mounted on the insertion shaft mounting surface 40c of the case 40.

The shaft support member 33 includes: a groove portion 33a which engages with the rail portion 43 of the insertion shaft mounting surface 40c; and a support hole portion 33b in which the insertion shaft 32 is fitted.

The shaft support member 33 has: a bolt 33c which fastens split fastening portions of the groove portion 33a; and a bolt 33d which fastens split fastening portions of the support hole portion 33b.

The shaft support member 33 is slidable along the rail portion 43, is set at an arbitrary slide position, and is fixed by the bolt 33c.

A fitting depth of the insertion shaft 32 into the support hole portion 33b is adjustable. A protruding amount of the insertion shaft 32 from the shaft support member 33 is set to an arbitrary amount and, then, the insertion shaft 32 is fixed by the bolt 33d.

The insertion shaft 32 has: a fixing shaft portion 32a which is fitted in the support hole portion 33b of the shaft support member 33; and a positioning shaft portion 32b which is inserted into the guide hole 23 of the cylinder head 16. The fixing shaft portion 32a and the positioning shaft portion 32b are formed coaxially with each other, and the positioning shaft portion 32b has a smaller diameter than the fixing shaft portion 32a. A distal end surface of the fixing shaft portion 32a forms an annular stepped portion 32c.

The operation member 34 is mounted on an operation shaft mounting surface 40d of the case 40.

The operation member 34 has: a rod-like mounting portion 34a which is mounted on the rail portion 44 of the operation shaft mounting surface 40d; and an operation shaft 34b.

The mounting portion 34a extends from the case 40 toward a side opposite to the insertion shaft 32. The mounting portion 34a has a groove portion 34c which engages with the rail portion 44 on a proximal end portion thereof. The mounting portion 34a includes a bolt 34d which fastens split fastening portions of the groove portion 34c.

The operation member 34 is slidable along the rail portion 44 by way of the groove portion 34c, is set at an arbitrary slide position, and is fixed by the bolt 34d.

The operation shaft 34b is a shaft portion which has a circular shape in cross section and extends from a distal end portion of the mounting portion 34a. The operation shaft 34b is a portion which a measurer grips at the time of performing the measurement using the measuring jig 11.

The operation shaft 34b is positioned on a side opposite to the insertion shaft 32 with the measuring instrument 31 sandwiched therebetween. The operation shaft 34b extends parallel to the insertion shaft 32 and in a direction opposite to a direction that the insertion shaft 32 extends.

The measuring instrument 31 is disposed on an axis 32d of the insertion shaft 32. To be more specific, the case 40 and the display part 42 of the measuring instrument 31 are disposed on the axis 32d. The probe 41 is positioned around the axis 32d.

The axis 32d of the insertion shaft 32 is inclined with respect to the case axis 40b of the case 40, and the axis 32d intersects with the case axis 40b. That is, the case 40 is disposed in a direction that a longitudinal direction of the case 40 is inclined with respect to the axis 32d of the insertion shaft 32.

The measuring instrument 31 is disposed on an operation axis 34e which is an axis of the operation shaft 34b of the operation member 34. To be more specific, the case 40 and the display part 42 of the measuring instrument 31 are disposed on the operation axis 34e.

The axis 32d of the insertion shaft 32 and the operation axis 34e of the operation shaft 34b have a coaxial positional relationship where the insertion shaft 32 and the operation shaft 34b are disposed coaxially with each other. That is, the case 40 is positioned on both the axis 32d and the operation axis 34e, and is disposed between the insertion shaft 32 and the operation shaft 34b.

Figure 6:
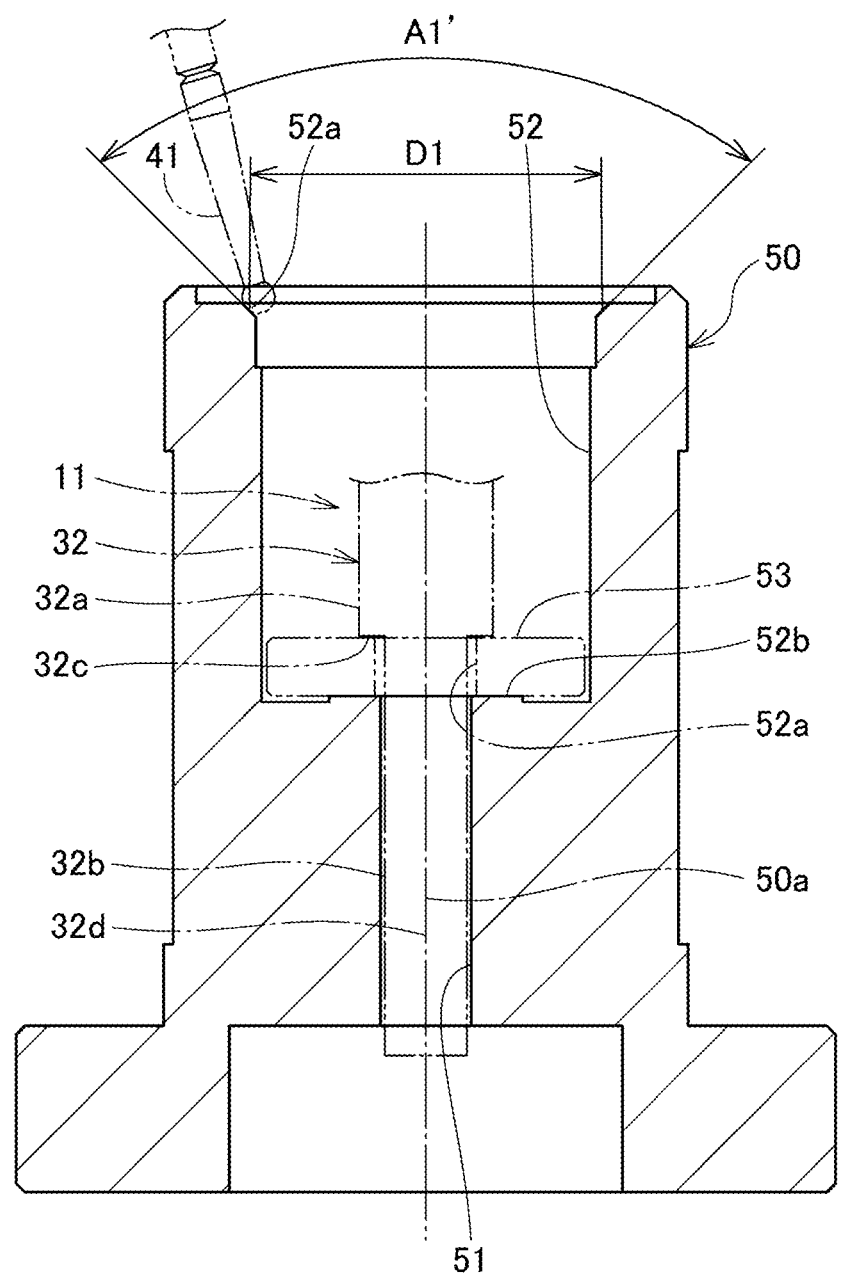
FIG. 6 is a cross-sectional view of a master gauge.

FIG. 6 is a cross-sectional view of a master gauge 50.

The master gauge 50 is a jig used in conformity with the measuring jig 11 for setting a reference value D1 (a zero point) to the measuring instrument 31 at the time of performing measurement using the measuring jig 11.

The master gauge 50 has a circular cylindrical shape. An inner peripheral portion of the master gauge 50 has: a positioning hole 51 in which the positioning shaft portion 32b of the insertion shaft 32 is fitted; and an inner diameter reference hole 52 having a larger diameter than the positioning hole 51.

The inner diameter reference hole 52 communicates with the positioning hole 51, and is disposed coaxially with the positioning hole 51. The inner diameter reference hole 52 has a larger diameter than the fixing shaft portion 32a of the insertion shaft 32, and the fixing shaft portion 32a is inserted into the inner diameter reference hole 52.

A reference diameter portion 52a whose inner diameter is preliminarily set to the reference value D1 is formed on an opening end of the inner diameter reference hole 52. The inner diameter of the reference diameter portion 52a is set to a value which becomes the reference with respect to the inner diameter of the valve contact surface 25a of the valve hole portion 20. The reference diameter portion 52a is formed in a tapered inclined surface in the same manner as the valve contact surface 25a. The reference value D1 corresponds to an inner diameter D2 of the valve contact surface 25a, and has a predetermined range. The reference diameter portion 52a and the positioning hole 51 are disposed coaxially with a master gauge axis 50a which is an axis of the master gauge 50. An angle A1' of a taper of the reference diameter portion 52a is equal to the angle A1 of the taper of the valve contact surface 27a, as one example, when the angle A1 is 90°, the angle A1' is also 90°. In this manner, the size and shape of the reference diameter portion 52a are set to be equal to the size and shape of the valve contact surface 25a which is an object to be measured. Accordingly, the valve contact surface 25a can be measured accurately.

The shape of the master gauge 50 is not limited to the shape shown in FIG. 6. For example, a part where the guide hole 23 and the valve hole portion 20 of the cylinder body 10 are worked with high accurately so as to enable the use of the part as a master gauge may be used as such a master gauge.

In the measuring jig 11, the stepped portion 32c is brought into contact with a bottom portion 52b of the inner diameter reference hole 52 in a state where the positioning shaft portion 32b is fitted in the positioning hole 51 and hence, the measuring jig 11 is positioned in an axial direction of the master gauge 50. The reference value D1 is set in the measuring jig 11 by bringing the probe 41 into contact with the reference diameter portion 52a of the master gauge 50 in such a state.

The master gauge 50 includes a spacer 53 which is mountable on the bottom portion 52b of the inner diameter reference hole 52. The spacer 53 has a hole 53a through which the positioning shaft portion 32b passes.

In the master gauge 50, the spacer 53 is disposed between the stepped portion 32c and the bottom portion 52b of the inner diameter reference hole 52 and hence, the position of the measuring jig 11 with respect to the master gauge 50 in the axial direction is adjusted. With such a configuration, the probe 41 can be properly brought into contact with the reference diameter portion 52a and hence, the measuring jig 11 can be accurately set with respect to the reference value D1. The spacer 53 is formed of a plurality of spacers which differ from each other in thickness so as to properly adjust the position of the master gauge 50.

One example of steps of measuring the inner diameter of the valve contact surface 25a of the valve hole portion 20 using the measuring jig 11 is described hereinafter.

First, as shown in FIG. 6, the measuring jig 11 is set on the master gauge 50, and the measuring instrument 31 is set to the reference value D1.

To be more specific, with respect to the measuring jig 11, the insertion shaft 32 of the measuring jig 11 is positioned coaxially with the positioning hole 51 of the master gauge 50 due to fitting of the positioning shaft portion 32b into the positioning hole 51 of the master gauge 50. The axis 32d of the insertion shaft 32 is disposed coaxially with the master gauge axis 50a. The stepped portion 32c of the measuring jig 11 is brought into contact with the bottom portion 52b of the inner diameter reference hole 52 and hence, the measuring jig 11 is positioned in the axial direction of the master gauge 50, and the probe 41 is brought into contact with the inner wall of the reference diameter portion 52a.

In such an operation, the spacer 53 is used when necessary. Further, the probe 41 can be positioned with respect to the reference diameter portion 52a also by adjusting a protruding amount of the insertion shaft 32 into the shaft support member 33 by moving the insertion shaft 32 in the axial direction by loosening the bolt 33d.

Next, a measurer grips the operation shaft 34b, and rotates the measuring jig 11 one turn about the axis 32d of the insertion shaft 32. With such an operation, the measuring instrument 31 turns about the axis 32d and measures an inner diameter of the reference diameter portion 52a using the probe 41 which slides on the reference diameter portion 52a. The inner diameter of the reference diameter portion 52a is the reference value D1.

The measurer sets the measured inner diameter of the reference diameter portion 52a as the reference value D1 which is a zero point on the measuring instrument 31. To be more specific, the measurer rotates the scale plate 42b of the display part 42 and makes the zero point on the scale plate 42b agree with the position of the pointer 42a.

Subsequently, to describe the embodiment with reference to FIG. 1 to FIG. 3, the measurer removes the measuring jig 11 from the master gauge 50 and sets the measuring jig 11 on the cylinder body 10.

To be more specific, the measurer puts the measuring jig 11 into the inner peripheral portion 13a of the cylinder 13 from the opening 13c on one end of the cylinder 13, inserts the positioning shaft portion 32b of the insertion shaft 32 into the guide hole 23, and brings the stepped portion 32c into contact with a bottom portion 20a of the valve hole portion 20. In this embodiment, the bottom portion 20a of the valve hole portion 20 forms an end surface of the valve stem holder 23a.

With such an operation, the measuring jig 11 is positioned in the axial direction of the insertion shaft 32 such that the insertion shaft 32 is positioned coaxially with the guide hole 23, and the probe 41 is brought into contact with the inner peripheral surface of the valve contact surface 25a.

Next, the measurer grips the operation shaft 34b, and rotates the measuring jig 11 one turn in a rotational direction R (FIG. 3) about the axis 32d of the insertion shaft 32. With such an operation, the measuring instrument 31 turns about the axis 32d, and the inner diameter D2 of the valve contact surface 25a of the valve hole portion 20 is measured by the probe 41 which slides on the valve contact surface 25a. That is, the probe 41 measures a portion of the inner diameter of the valve hole portion 20 where an angle of the taper is the angle A1 (90° as one example).

To be more specific, the reference value D1 of the master gauge 50 is set at the zero point as described above and hence, the difference between the reference value D1 and the inner diameter D2 of the valve contact surface 25a is displayed on the display part 42. The difference means a circular run-out of the inner diameter D2 of the valve contact surface 25a when the probe 41 turns around the valve contact surface 25a one turn with reference to the guide hole 23.

In the same manner as the intake side, the inner diameter of the valve contact surface 27a of the exhaust-side valve hole portion 22 is measured by rotating the measuring jig 11 about the axis 32d of the insertion shaft 32 in a state where the positioning shaft portion 32b of the insertion shaft 32 is inserted into the guide hole 24.

In the measuring jig 11, the measuring instrument 31 is positioned on the axis 32d of the insertion shaft 32 and hence, at the time of measuring the valve contact surface 25a, a turning radius of the measuring instrument 31 about the axis 32d is small. Accordingly, even when a space around the measuring jig 11 is limited, an inner diameter of the valve contact surface 25a can be measured.

In measuring the valve contact surface 25a, the shaft support member 33, the measuring instrument 31, and the operation member 34 turn in the inner peripheral portion 13a of the cylinder 13. The cylinder body 10 is an integral body formed of the cylinder head 16 and the cylinder 13 and hence, unless the cylinder 13 is separated from the cylinder head 16 by cutting or the like, a large space cannot be ensured around the valve contact surface 25a. However, the measuring jig 11 is turnable in the cylinder 13 and hence, the measurement of the valve contact surface 25a can be performed without cutting the cylinder 13.

The measuring instrument 31 is positioned on the operation axis 34e of the operation shaft 34b which the measurer grips and hence, the run-out of the operation shaft 34b when the measuring instrument 31 turns is small. Accordingly, a space which the operation shaft 34b occupies at the time of performing the measurement can be made small, and the measurer can easily operate the operation shaft 34b.

Further, the operation axis 34e is coaxial with the axis 32d of the insertion shaft 32 and hence, the run-out of the operation shaft 34b when the measuring instrument 31 turns can be made small.

As has been described heretofore, according to the first embodiment to which the present invention is applied, the measuring jig 11 is a measuring jig for measuring an inner diameter of the valve hole portion 20 which is formed coaxially with the guide hole 23 which forms the reference hole, wherein the measuring jig 11 includes: the insertion shaft 32 which is inserted into the guide hole 23; and the measuring instrument 31 which is mounted around the axis 32d of the insertion shaft 32 and has the probe 41 which is brought into contact with the inner wall of the valve hole portion 20. By rotating the measuring instrument 31 about the axis 32d, the inner diameter D2 of the valve hole portion 20 is measured by way of the probe 41, and the measuring instrument 31 is disposed on the axis 32d.

With such a configuration, the measuring instrument 31 is disposed on the axis 32d of the insertion shaft 32 and hence, a turning radius of the measuring instrument 31 about the axis 32d becomes small. Accordingly, even when a space around the measuring jig 11 is limited, the inner diameter D2 of the valve hole portion 20 can be measured.

The measuring jig 11 includes the operation shaft 34b for turning the measuring instrument 31, and the measuring instrument 31 is positioned on the operation axis 34e which is an axis of the operation shaft 34b. With such a configuration, the run-out of the operation shaft 34b at the time of turning the measuring instrument 31 about the axis 32d of the insertion shaft 32 can be made small, and even when a space around the measuring jig 11 is limited, the inner diameter D2 of the valve hole portion 20 can be measured.

The axis 32d of the insertion shaft 32 and the operation axis 34e are disposed coaxially with each other. With such a configuration, the run-out of the operation shaft 34b at the time of turning the measuring instrument 31 about the axis 32d of the insertion shaft 32 can be made small and hence, even when a space around the measuring jig 11 is limited, the inner diameter D2 of the valve hole portion 20 can be measured.

The master gauge 50 having the positioning hole 51 for positioning the insertion shaft 32 and the inner diameter reference hole 52 which is formed coaxially with the positioning hole 51 and whose inner diameter is preliminarily set to the reference value D1 is further provided. By turning the measuring instrument 31 about the axis 32d of the insertion shaft 32 in a state where the insertion shaft 32 is positioned with respect to the master gauge 50 by the positioning hole 51, the reference value D1 which is an inner diameter of the inner diameter reference hole 52 is measured by way of the probe 41, and the difference between the reference value D1 and the inner diameter D2 of the valve hole portion 20 is measured. With such a configuration, based on the reference value D1 of the master gauge 50, the inner diameter D2 of the valve hole portion 20 can be easily measured with high accuracy.

The hole portion to be measured by the measuring jig 11 is the valve hole portion 20 of the engine including the cylinder head 16 and the cylinder 13, and the cylinder head 16 and the cylinder 13 are formed as an integral body, the measuring instrument 31 turns in the cylinder 13. With such a configuration, even when the cylinder head 16 and the cylinder 13 are not easily separated from each other, the inner diameter D2 of the valve hole portion 20 of the engine can be measured by turning the measuring instrument 31 in the cylinder 13.

The valve hole portion 20 has the valve contact surface 25a with which the valve face of the intake valve 14 of the engine is brought into contact, and the probe 41 measures the inner diameter D2 of the valve contact surface 25a. With such a configuration, even when a space around the measuring jig 11 is limited, the inner diameter D2 of the valve contact surface 25a of the valve hole portion 20 can be measured.

The measuring instrument 31 includes the probe 41 and the case 40 which supports the probe 41 in a swingable manner, and the case 40 is disposed on the axis 32d. With such a configuration, a turning radius of the case 40 about the axis 32d of the insertion shaft 32 becomes small. Accordingly, even when a space around the measuring jig 11 is limited, the inner diameter D2 of the valve hole portion 20 can be measured.

The case 40 is formed into a box shape, the probe 41 is supported on one end portion of the case 40 in the longitudinal direction of the case 40, the insertion shaft 32 is mounted on the case 40, and the axis 32d of the insertion shaft 32 is inclined with respect to the case axis 40b which is the axis of the case 40 in the longitudinal direction of the case 40. With such a configuration, the axis 32d of the insertion shaft 32 is inclined with respect to the case axis 40b of the measuring instrument 31 and hence, the measuring instrument 31 can be easily disposed on the axis 32d of the insertion shaft 32. Further, an area of the insertion shaft mounting surface 40c which is a portion of the case 40 for mounting the insertion shaft 32 can be increased, thus effectively fixing the insertion shaft 32 to the case 40.

The case 40 has the insertion shaft mounting surface 40c on which the insertion shaft 32 is mounted, and the operation shaft mounting surface 40d which is positioned on a side opposite to the insertion shaft mounting surface 40c, and the operation shaft 34b for turning the measuring instrument 31 is mounted on the operation shaft mounting surface 40d. With such a configuration, the operation shaft 34b is mounted on the operation shaft mounting surface 40d positioned on a side opposite to the insertion shaft mounting surface 40c and hence, the operation shaft 34b can be disposed in a compact manner.

The insertion shaft 32 has the stepped portion 32c which is brought into contact with the bottom portion 20a of the valve hole portion 20. With such a configuration, by bringing the stepped portion 32c of the insertion shaft 32 into contact with the bottom portion 20a of the valve hole portion 20, the measuring instrument 31 can be positioned in the axial direction of the insertion shaft 32 so that the inner diameter of the valve hole portion 20 can be measured accurately.

The insertion shaft 32 has the stepped portion 32c which is brought into contact with the bottom portion 20a of the valve hole portion 20, and the master gauge 50 includes the spacer 53 which is interposed between the stepped portion 32c of the insertion shaft 32 and the master gauge 50. With such a configuration, due to the spacer 53 which is interposed between the stepped portion 32c of the insertion shaft 32 and the master gauge 50, the measuring instrument 31 can be positioned at the proper position with respect to the master gauge 50 in the axial direction, thus properly setting the reference value D1 to the measuring instrument 31.

The insertion shaft 32 is supported in a state where a length of the insertion shaft 32 in the axial direction can be adjusted with respect to the measuring instrument 31. With such a configuration, a length of the insertion shaft 32 can be adjusted corresponding to the shapes of the guide hole 23 and the valve hole portion 20 and hence, it is possible to acquire the measuring jig 11 having high versatility. Further, by adjusting the position of the insertion shaft 32, the measuring instrument 31 can be positioned at the proper position with respect to the master gauge 50 in the axial direction, thus properly setting the reference value D1 to the measuring instrument 31.

Second Embodiment

Hereinafter, a second embodiment to which the present invention is applied is described with reference to FIG. 7. In the second embodiment, parts having the identical configurations as the above-mentioned first embodiment are given the same symbols, and the repeated description of the parts is omitted.

A measuring jig 211 of the second embodiment differs from the measuring jig 11 according to the above-mentioned first embodiment in configuration with respect to the arrangement of an operation shaft 234b.

Figure 7:
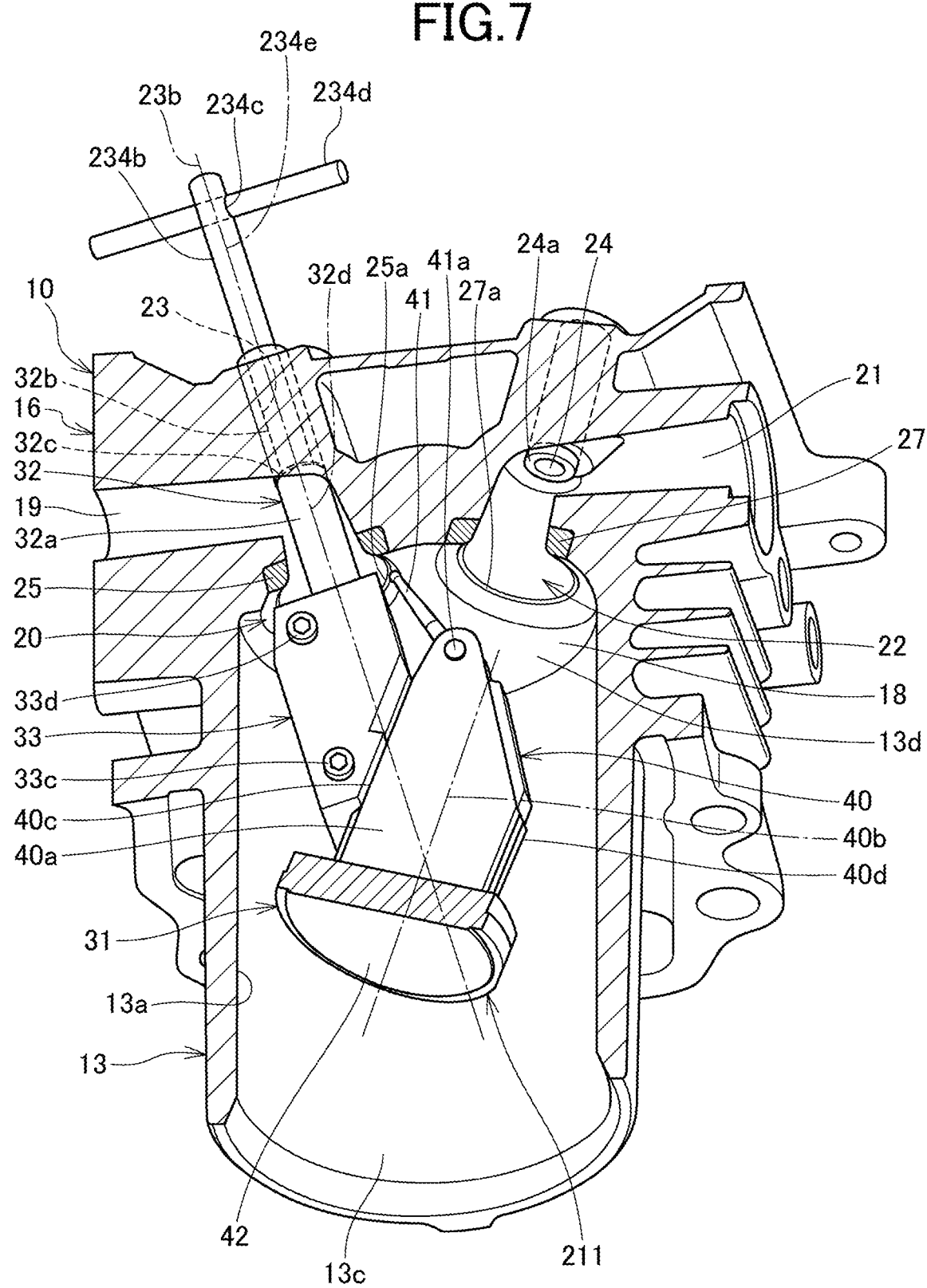
FIG. 7 is a cross-sectional view showing a state where a shape of the cylinder body is measured by a measuring jig according to a second embodiment.

FIG. 7 is a cross-sectional view showing a state where a shape of the cylinder body 10 is measured by the measuring jig 211 according to the second embodiment.

The measuring jig 211 includes a measuring instrument 31, an insertion shaft 32, a shaft support member 33 for fixing the insertion shaft 32 to the measuring instrument 31, and the operation shaft 234b which a measurer grips.

The operation shaft 234b is a shaft obtained by extending the insertion shaft 32 in an axial direction, and is formed coaxially with the insertion shaft 32.

The measuring instrument 31 is positioned on an operation axis 234e which is an axis of the operation shaft 234b.

The operation shaft 234b protrudes from an opening on an outer end of the guide hole 23 to the outside of the cylinder head 16. A hole 234c which penetrates the operation shaft 234b in a radial direction is formed on a distal end portion of the operation shaft 234b, and an operation handle 234d which a measurer can grip at the time of performing the measurement is detachably inserted into the hole 234c.

The operation handle 234d is mounted in the hole 234c after the operation shaft 234b passes through the guide hole 23.

The operation shaft 234b extends from the guide hole 23 to the outside of the cylinder head 16 without passing through the inside of the cylinder 13. Accordingly, even in the case where it is difficult to dispose an operation shaft in the cylinder 13, the operation shaft 234b can be provided. A measurer can operate the operation shaft 234b outside the cylinder head 16 and hence, the handling of the operation shaft 234b can be facilitated so that the measurer can easily perform the measurement.

According to the second embodiment, the operation shaft 234b for turning the measuring instrument 31 is provided, and the operation shaft 234b passes through the guide hole 23 and extends to the outside of the cylinder head 16. With such a configuration, the handling of the operation shaft 234b can be facilitated.

The above-mentioned first and second embodiments are embodiments showing one mode to which the present invention is applied, and the present invention is not limited to the above-mentioned first and second embodiments.

In the above-mentioned first and second embodiments, the description has been made by taking the measuring jig 11, 211 which measures the inner diameter D2 of the valve hole portion 20 formed coaxially with the guide hole 23 as an example. However, the present invention is not limited to the above-mentioned first and second embodiments. The measuring jig 11, 211 is widely applicable irrespective of an object to be measured provided that the measuring jig 11, 211 is used for measuring an inner diameter of a hole portion which is formed coaxially with a reference hole. In the above-mentioned first and second embodiments, the description has been made by taking the case where the inner diameter D2 of the valve contact surface 25a of the valve hole portion 20 is measured by the measuring jig 11, 211 as an example. However, the present invention is not limited to the above-mentioned first and second embodiments. For example, the measuring jigs 11, 211 may be used for measuring an inner diameter of a shroud portion which is formed on a periphery of the valve contact surface 25a in a raised manner for generating a tumble flow in intake air flowing into the combustion chamber 18 from the valve hole portion 20.

Further, the description has been made assuming that the valve contact surface 25a, the first inclined surface portion 25b, and the second inclined surface portion 25c are formed on the opening end of the valve hole portion 20. However, it is sufficient that at least the valve contact surface 25a is formed on the opening end of the valve hole portion 20.

REFERENCE SIGNS LIST 11, 211 . . . measuring jig
13 . . . cylinder
14 . . . intake valve (valve)
16 . . . cylinder head
20 . . . valve hole portion (hole portion)
20a . . . bottom portion
23 . . . guide hole (reference hole)
25a . . . valve contact surface
31 . . . measuring instrument
32 . . . insertion shaft
32c . . . stepped portion
32d . . . axis
34b, 234b . . . operation shaft
34e . . . operation axis
40 . . . case
40b . . . case axis
40c . . . insertion shaft mounting surface
40d . . . operation shaft mounting surface
41 . . . probe
50 . . . master gauge
51 . . . positioning hole
52 . . . inner diameter reference hole
53 . . . spacer
D1 . . . reference value
D2 . . . inner diameter

The invention claimed is:

1. A measuring jig for measuring an inner diameter of a hole portion formed coaxially with a reference hole, the measuring jig comprising:
an insertion shaft inserted into the reference hole; and
a measuring instrument having a probe that is disposed around an axis of the insertion shaft and that is brought into contact with an inner wall of the hole portion,
wherein the inner diameter of the hole portion is measured by way of the probe by turning the measuring instrument about the axis, and
the measuring instrument is disposed on the axis.

2. The measuring jig according to claim 1,
wherein the measuring jig includes an operation shaft for turning the measuring instrument, and
the measuring instrument is positioned on an operation axis that is an axis of the operation shaft.

3. The measuring jig according to claim 2, wherein the axis of the insertion shaft and the operation axis are disposed coaxially with each other.

4. The measuring jig according to claim 1, further comprising a master gauge having: a positioning hole formed for positioning the insertion shaft; and an inner diameter reference hole provided coaxially with the positioning hole, an inner diameter of the inner diameter reference hole being preliminarily set to a reference value,
wherein the reference value that is an inner diameter of the inner diameter reference hole is measured by way of the probe by turning the measuring instrument about the axis of the insertion shaft in a state where the insertion shaft is positioned by the positioning hole with respect to the master gauge, and
a difference between the reference value and the inner diameter of the hole portion is measured.

5. The measuring jig according to claim 1,
wherein the hole portion is a valve hole portion of an engine including a cylinder head and a cylinder,
the cylinder head and the cylinder are integrally formed with each other, and
the measuring instrument is configured to turn in the cylinder.

6. The measuring jig according to claim 5,
wherein the valve hole portion includes a valve contact surface with which a valve face of a valve of the engine is brought into contact, and
the probe is configured to measure an inner diameter of the valve contact surface.

7. The measuring jig according to claim 1,
wherein the measuring instrument includes the probe, and a case that supports the probe in a swingable manner, and
the case is disposed on the axis.

8. The measuring jig according to claim 7,
wherein the case is formed into a box shape and the probe is supported on one end portion of the case in a longitudinal direction of the case, the insertion shaft is mounted on the case, and the axis of the insertion shaft is inclined with respect to a case axis that is an axis of the case in the longitudinal direction of the case.

9. The measuring jig according to claim 8, wherein the case includes: an insertion shaft mounting surface on which the insertion shaft is mounted; and an operation shaft mounting surface positioned on a side opposite to the insertion shaft mounting surface, and the operation shaft for turning the measuring instrument is mounted on the operation shaft mounting surface.

10. The measuring jig according to claim 1, wherein the insertion shaft includes a stepped portion that is brought into contact with a bottom portion of the hole portion.

11. The measuring jig according to claim 1, wherein the insertion shaft is supported in a state where a length of the insertion shaft in an axial direction is adjustable with respect to the measuring instrument.

12. The measuring jig according to claim 4, wherein the insertion shaft includes a stepped portion that is brought into contact with a bottom portion of the hole portion, and the master gauge includes a spacer that is interposed between the stepped portion of the insertion shaft and the master gauge.

13. The measuring jig according to claim 12, wherein the insertion shaft is supported in a state where a length of the insertion shaft in the axial direction is adjustable with respect to the measuring instrument.

14. The measuring jig according to claim 5, wherein the measuring jig includes an operation shaft for turning the measuring instrument, the operation shaft passing through the reference hole and extending to the outside of the cylinder head.

* * * * *